United States Patent [19]

Balkany et al.

[11] Patent Number: 5,102,837
[45] Date of Patent: Apr. 7, 1992

[54] PROCESS FOR THE PREPARATION OF OPALIFORM PORCELLANITE

[75] Inventors: Andre Balkany; Pnina Strongin, both of Beer Sheva, Israel

[73] Assignee: Research and Development of Natural Resources, Ltd., Beer Sheva, Israel

[21] Appl. No.: 583,593

[22] Filed: Sep. 17, 1990

[30] Foreign Application Priority Data

Sep. 18, 1989 [IL] Israel ......................................... 91671

[51] Int. Cl.$^5$ ............................................. C04B 33/00
[52] U.S. Cl. ................................. 501/141; 501/149; 23/313 AS; 423/335; 423/340
[58] Field of Search ........................ 423/335, 340; 23/323 AS; 501/149, 141

[56] References Cited

U.S. PATENT DOCUMENTS

| | | | |
|---|---|---|---|
| 3,116,973 | 1/1964 | Haden | 423/335 |
| 3,365,273 | 1/1968 | Siemers | 423/335 X |
| 3,954,944 | 5/1976 | Aldcroft et al. | 423/335 |

*Primary Examiner*—Karl Group
*Attorney, Agent, or Firm*—Fleit, Jacobson, Cohn, Price, Holman & Stern

[57] ABSTRACT

The present invention provides high grade opaliform porcellanite having a purity of at least 80% active silica. The invention also provides a process for the production of a high grade opaliform porcellanite having a purity of at least 80% active silica comprising grinding and screening porcellanite rock to form granules having an average diameter of between about 0.6 and 18 mm and then subjecting said granules to wet disintegration to remove soft clays and limestone and gravitic separation to separate the lower density opaliform active silica from higher density impurities intermixed therewith.

10 Claims, No Drawings

PROCESS FOR THE PREPARATION OF OPALIFORM PORCELLANITE

The present invention relates to high grade opaliform porcellanite and to processes for the preparation thereof.

Porcellanite is a natural mineral raw material found in the earth in scarce quantities. It occurs in the coastal regions of different countries but also in rare dispersions in semi-closed basins such as Israel.

The porcellanite rock contains as basic and useful component the so-called opal-CT which is a crystalline polymorf of $SiO_2$ including $H_2O$ in its network, which component has been described in the literature including in Kirk-Othmer, but which has heretofore defied purification to a commercially utilizable product.

There were identified some special properties of this mineral matter which favorably differentiates it from quartz-sand with similar chemical composition ($SiO_2$). First of all, this opaliform silica is highly reactive and thus can be easily dissolved in alkaline hydroxides (by hydrothermal process at low temperature and overpressure). In addition, this opaliform mineral is a cryptocrystalline form of silica (cristobalite or tridymite) with microscopic pores, large pore volumes and surface area, attributes which provide significant adsorptive capacity and related properties to this rare form of silica.

A prevailing prerequisite of rendering profitable this useful mineral substance is the need to obtain the same in relatively high purity.

Exploration samples of the Israeli porcellanite occurrence indicate contents of opal (active silica) in the range of 20-65%. Accompanying mineral impurities are: limestone-calcite ($CaCO_3$) amounting to 25-60%, flint ($SiO_2$) and about 4-15%, and clays, limonitic iron oxides, quartz-sand, and other impurities as subordinate components (3-4%).

While many mineral processing operations are known heretofor, a process for upgrading the porcellanite to a purity of commercial significance and interest has not been found.

Thus the best process suggested and attempted to-date involved classification by bulk screening in five broad size ranges, selective grinding-sizing in a tumbling mill, selective liberation by thermal shock and froth flotation.

This process resulted in an increase in opaliform content from 58% to 70-75%, but this was still insufficient purity for commercial use.

Specifically, there are many potential uses, both direct and indirect, for opaliform active silica, however, all of them require a product purity of at least 80% and some require a purity of at least 90 or even 95%.

Thus some of the direct utilizations of opaliform active silica include:
a. Silica bricks (for open-hearth furnaces).
b. Speciality glasses (for optical purposes).
c. Laboratory glassware.
d. Silica fibers (in precision instruments).
e. Pyrogenic or fumed silica.
f. Filler and reinforcing material (in rubber, paints. etc.).
g. Sodium silicate (waterglass).

Some of the e.g., indirect utilizations of sodium silicate include:
a. Silica gel (catalyst, adsorbent, filtering material, dehydrating agent).
b. Detergent (in detergents, and soap industry).
c. Adhesive (adhesion to glass, wood, metal and paper).
d. Binder (forming bricks or moulded objects).
e. Zeolites and insoluble silicates (various uses).
f. Oil recovery (enhancing oil flow in porous substances).

It is to be noted, however, that the projected prerequisite content of "active silica" for various applications are as follows:
a. Silica gels (96-99%) below this content have unsatisfactory surface area.
b. Precipitated silica (95%) to achieve a minimum surface area of 40-45 $m^2/g$.
c. Pyrogenic silica (97-99.9%) to enable the manufacture of pyrogenic silica.
d. Silica bricks (light weight aggregates) (92-95%) to obtain bulk density of 0.7-0.9 $g/cm^3$.
e. Oil recovery (88-95%) to ensure an oil absorption capacity of 1-3 g/g.
f. Detergents (86-92%) to avoid deleterious effect of impurities (mainly $CaCO_3$).

According to the present invention there is now provided for the first time high grade opaliform porcellanite having a purity of at least 80% active silica. In its preferred embodiments the present invention provides high grade opaliform porcellanite having a purity of at least 85% or 90% active silica and even high grade opaliform porcellanite having a purity of at least 95% active silica.

The present invention provides a process for the production of a high grade opaliform porcellanite having a purity of at least 80% active silica comprising grinding and screening porcellanite rock to form granules having an average diameter of between about 0.6 and 18 mm and then subjecting said granules to wet disintegration to remove soft clays and limestone and gravitic separation to separate the lower density opaliform active silica from higher density impurities intermixed therewith.

In a first embodiment of the present invention said granules are first subjected to gravitic separation to separate the opaliform active silica from higher density flint, quartz and limestone intermixed therewith whereafter the remaining granules are subjected to wet disintegration to remove soft clays and limestone therefrom.

In especially preferred embodiments of the present invention said granules are first subjected to wet disintegration to remove soft clays and limestone whereafter the remaining granules are subjected to gravitic separation to separate the opaliform active silica from higher density flint, quartz and limestone intermixed therewith.

Basically, the process flow sheet of achieving very high grade porcellanite consists of the following main stages:

The mined raw porcellanite which appears in lumpy condition is subjected to a preparatory size reduction process by crushing in an adequate breaking device. Crushing operation is intended to reduce lumps to fragments, and of which objectives in the case of porcellanite are: to liberate dissimilar minerals (opal, calcite and flint) from attachment to each other, and to create new sizes of material which are susceptible to be processed by various severance and concentration methods.

After crushing, the material is bulk classified by screening. This sizing operation is carried out by passing the comminuted porcellanite rock through a series of sieves grouped in a geometric scale with an approximative ratio of $\sqrt{3}$ (or 1.73) starting from the average top size resulted by rock fragmentation (9.5-6.3-4.0-2.-

5–1.6–1 mm) or (⅜–¼ inch–5–7–10–18 mesh) respectively.

Size ranges obtained by bulk sorting are individually subjected to wet scrubbing-rubbing operation, excepting the finest fraction (under 1 mm) which is removed from the process.

Alternatively, dry scrubbing could be carried out using resilient balls to separate the softer $CaCO_3$ from the harder $SiO_2$.

Wet scrubbing is a disintegration operation effected by relatively gentle forces, being capable of breaking down only soft unconsolidated mineral components which in the case of porcellanite are limestone (calcite), clays and limonite. Since in the porcellanite rock the above-mentioned materials partly occur as a bonding cement, a rotating (drum) scrubber has been considered to be of maximum efficiency. Disintegration takes place by the joint action of tumbling motion of the mass, washing with aid of water, and optionally by addition of a light load of balls.

Optionally an acid such as dilute HCl could de added to the water to aid in the selective disintegration of the $CaCO_3$.

Variable factors of wet disintegration are:

water/solids ratio (per weight), balls/solids ratio (per weight) total bulk load of the scrubbing shell, rotating speed of the device, and operating time.

The slurry discarded from the scrubber is screened under a water jet on a sieve of 1 mm apertures (18 mesh), whereby the soft material consisting of clays, limonite, a significant part of limestone, and a part of opal are washed away in the undersize fraction.

Further upgrading of the porcellanite is performed gravity concentration.

Gravity concentration methods of separating the component mineral grains of the rock are based on different specific gravity of flint and quartz (2.5–2.7), of limestone (2.55–2.7), and of opaliform silica (1.4–1.5).

Mineral mixture of porcellanite is certainly susceptible to separation by gravity since the valuable mineral (opal) and gangue (limestone and flint) differ appreciably in specific gravity.

Separation gravity is governed by the rule of equivalent settling particles, or the so-called "concentration criterion" expressed by the ratio $$S_H - D/S_L - D$$

where D is the density of the medium in which the separation is performed, and $S_H$ and $S_L$ are the specific gravities of the heavier and lighter minerals respectively.

In the case of porcellanite, when the medium is water, the concentration criterion varies in the range:

max. $2.7 - 1/1.4 - 1 = 4$ min. $2.5 - 1/1.5 - 1 = 3$

The bulk classification based on geometrical scale of $\sqrt{3}$ (or 1.73) overwhelmingly covers that of concentration criterion.

Gravitic separation or concentration can be carried out by the sink-float or dense medium method utilizing a heavy liquid having a density of between about 1.6 and 2, jigging device, or on a shaking table.

As will be described hereafter different sized fractions can he subjected to different gravitic separation techniques.

For the particular method of sink-and-float separation, the medium must have a specific gravity at least equal to that of the float (lighter) mineral.

Heavy liquids and heavy media which come into consideration for use in this method include:

Zinc chloride ($ZnCl_2$) solution, calcium chloride ($CaCl_2$) solution, tetra bromethane (TBE), magnetite ($Fe_3O_4$) suspension and ferrosilicon (FeSi) suspension.

Zinc chloride solution having a density of about 1.6–1.8 gr/ml is especially preferred.

Dense medium separation is performed in a stationary media, in the present process a heavy liquid (zinc chloride solution), characterized by the fact that this separating liquid does not offer resistance (excepting the viscosity) to the motion of solid granules. Preconcentrated porcellanite fractions, being free of primary slimes and fine material, efficiently undergo separation in suitably prepared heavy liquid.

The operation steps are performed in baths filled up with gradually decreasing density of zinc chloride solutions wherein the mineral grains are submerged. The "float" products are successively immerged in baths of less heavier liquid, while the "sink" products settled in the bottom of containers are removed from the process. The final floating product is collected as the lightest fraction (opal concentrate).

Jigging and tabling are alternative gravity concentration methods in which separating media are in flowing motion exerting forces on the particulates to be separated that are of the nature of impulses. The flowing media have vertical (jigging) or horizontal (tabling) resultant directional components.

The jigging device used in this process is essentially a box open at the top, with a perforate bottom (punched sheet), in which a relatively short-range separating bed is formed pulsating alternately upward-downward water currents. The box is loaded with the porcellanite size class to be processed, and operating water. In this wet jig, a stream of water develops a periodic expansion-compacting motion through the fixed sieve, and effect a stratification by gravity of that material, with the heavy mineral grains lowermost.

Controllable factors in jigging machine include:
a. Amplitude of jigging cycle.
b. Strokes per time unit.
c. Size and specific gravity of component particles.
d. Thickness of loaded bed of jig box.

The shaking table used in this process consists essentially of a plane surface, inclined slightly from the horizontal, shaken with a differential movement in the direction of its long axis and washed toward the direction of motion by a stream of water. The table is provided with riffles. The separating effect on the different mineral species introduced into a streaming current results from the reaction of particles to their lateral displacement (drift) and the resistance offered by each particle to further lateral displacement.

Particles traverse the sloping "deck" of the shaking table as fast as they are larger, or they are lighter. For size ranges previously classified according to the closed ratio of 1.73, the opal granules—being lightest—flow directly downward, the well individualized limestone and flint granules move across the riffles and are discarded at the opposite end to the feed position, and the partly unlocked grains leave the table in a middle position.

Operational variables of separating porcellanite components on shaking table are:
a. Table tilt (inclination).
b. Stroke amplitude (length of strokes).
c. Stroke frequency (strokes per time unit).
d. Pulp density (wash water output).
e. Position of product splitters.

The final operation of the process flow sheet consists of washing out the heavy liquid (zinc chloride solution) penetrated in the pores of opal granules (for sink-and-float method), air-drying of the useful material for all methods, and grinding.

Optionally, further purification to ranges of 96-99% and even higher purity can he obtained by washing with dilute acid. e.g., HCl, before the drying step to remove residual $CaCO_3$.

While the invention will now be described in connection with certain preferred embodiments in the following examples so that aspects thereof may he more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspect of the invention.

EXAMPLE 1

A raw porcellanite rock sample of 100 kg. was collected from the exploration mine. This appears in lumpy condition with a top size of about 100-120 mm (4-5 inch).

Size reduction of the raw material is carried out in a laboratory jaw crusher whereby granules of maximum 10 mm (⅜ inch) are obtained, corresponding to a reduction ratio of 10 to 12.

The resulting material is bulk classified by using a sieve series with a ratio of $\sqrt{3}$ (or 1.73). The distribution of size fractions, and their chemical-mineralogical composition are illustrated in Tables 1 and 2. It can be remarked that the useful component opal (tridymite) represents 43.3% of the raw porcellanite, the main accompanying minerals (calcite and flint+quartz sand) amount to 52.5%, and the difference of 4.2% appears as clays, limonitic iron oxides, and some soluble and organic matter.

For further processing, the fractions over 9.5 mm and under 1 mm respectively, are removed.

Each of the volumetrically separated size fractions is individually subjected to a differential wet disintegration in a closed ceramic tumbling jar (used as a scrubber) with aid of water and optionally of balls. Among the design and operational factors, the total volumetric load (60-65%), the tumbling velocity (55-60% of the critical rotation speed) and the operating time (15-17 minutes) were found invariably efficient within the above-mentioned limits, for each class of feed material.

All the experiments of wet disintegration were performed with charges of 2 kg. of material. Hence the capacity of tumbling jar was optionally 5 or 10 liters.

The controllable factors leading to optimum disintegration performance for each of the size classes, are:

| Size range (mm) | Water:solids ratio (per weight) | Solids:balls ratio | Size of Ceramic balls (mm 0) |
|---|---|---|---|
| 9.5/6.3 | 2.5:1 | 2:1 | 20-10 |
| 6.3/4.0 | 2.5:1 | 2.5:1 | 15-10 |
| 4.0/2.5 | 2.0:1 | 4:1 | 10 |
| 2.5/1.6 | 1.8:1 | 5:1 | 10 |
| 1.6/1.0 | 1.5:1 | no balls | — |

After its discharge from the jar the slurry is passed through a vibrating screen of 1 mm (18 mesh) apertures, under a water jet to wash out the fine sized crumbly material containing a substantial part of limestone (calcite), all clays and limonitic iron oxides, part of sandy-quartz, and a low percentage of opal (tridymite) and flint.

Parameters of the disintegration stage of process flow sheet are shown in Table 3.

This disintegration process, even conducted in moderate conditions, entails an accompanying comminution effect. Consequently, the products resulting after removing the fines (under 1 mm) are screened once more, and the various fractions are joined to their proper size class. A new grain size distribution is obtained, without significantly modifying the chemical composition of the fractions, as it can he seen in Table 4. Parameters of the Table 4 are related to the raw porcellanite.

Preconcentrated porcellanite-sized fragments are optionally air-dried (when prepared for heavy liquid separation) or directly processed in jigging or tabling operations.

After the removal of brittle mineral particulates, the remaining compact granules are amenable to all types of gravity concentration.

METHOD 1

Heavy Liquid Separation.

Zinc chloride solutions of specific gravity 1.5; 1.6; and 1.7 are prepared and used as heavy liquid for the separation of minerals from the preconcentrated porcellanite grains. Any other inorganic or organic solution or mixture which exhibits chemical inertness and low viscosity which can he prepared at similar density range, is suitable for this separation process at laboratory scale.

Each size category is processed individually. The solids are immersed in glass beakers filled up with different zinc chloride solutions, then the settled grains (sinks) and the floating grains are separately collected. After intensive washing under water jet (to remove the adsorbed zinc chloride solution), the useful light fractions (opal concentrates) are air-dried and finely ground.

Parameters of the sink-and-float (heavy liquid) separation are illustrated in Table 5. Attempts in heavy liquid in inadequate density were disregarded. The weight recovery is related to the operation itself. A material balance of heavy liquid separation related to the original raw porcellanite sample is given in Table 6.

METHOD 2

Jigging

A fixed-sieve laboratory jigging shell is used for this purpose. The screen of 100 cm² active surface has apertures of 0.710 mm (25 mesh), small enough to prevent penetration of the particulates through the sieve, and large enough to enable an unhindered passage of water stream which performs the mechanical jigging action.

Factors influencing jigging performance were found different for various size ranges.

Thickness of the bed of material (bulk load in jigging shell) was maintained relatively invariably for all batch operations.

Variable factors, for each of the classes, that have been experimentally determined as most favorable, are the following:

| Feed size (mm) | pulsation (strokes/minute) | length of strokes (mm) |
| --- | --- | --- |
| 1.6/1.0 | 280 | 8 |
| 2.5/1.6 | 260 | 13 |
| 4.0/2.5 | 220 | 15 |
| 6.3/4.0 | 180 | 20 |
| 9.5/6.3 | 150 | 26 |

The batch operation is considered concluded, when the mineral granules of lowest gravity form a macroscopically distinct top layer; the opal concentrate (upper layer), middling and tailing are discarded separately.

Since the largest size range (9.5/6.3 mm) behaves unsatisfactorily it is comminuted, bulk classified and processed in jigging device.

Performances obtained by the application of the jigging method of final concentration of opal from porcellanite are shown in Table 7 and the corresponding balance in Table 8.

METHOD 3

Tabling

A laboratory shaking table is used for this alternative method of concentrating the opaliform active silica from the porcellanite preconcentrate. The implement has a "deck" of 110×40 cm surface, covered with linoleum and provided with wood riffles.

As the usual applicability of shaking table is limited to feed sizes below 2-3 mm, depending on the relative specific gravities and shades of particles, the attempts of concentrating larger fractions were cautiously performed.

A constant slope annie of the device of about 9° is maintained for all the feed fractions.

Variable operating factors for different size ranges are related to the stroke amplitude and frequency of the deck motion and the solid-liquid ratio of the pulp, expressed by percent water in feed and wash water supply.

| They are: | | | |
| --- | --- | --- | --- |
| Size of feed (mm) | Speed (strokes per minute) | Length of stroke (mm) | Wash water (%) |
| 2.5/1.6 | 230 | 25 | 260 |
| 1.6/1.0 | 260 | 20 | 200 |
| 1.0/0.63 | 270 | 16 | 160 |

It was ascertained that maximum feasible size of feed is about 2.5/1.6 mm. Therefore, the larger size fractions are comminuted in order to obtain a top size of 1.6 mm, and sorted in two classes: 1.6/1.0 mm and 1.0/0.63 mm. Fines (under 0.63 mm) amounting to about 10-15% of this size fraction after grinding are rejected.

Parameters of the tabling method of concentrating the opal from porcellanite preconcentrates, are tabulated in Table 9. Material balance of this process is presented in Table 10.

An alternative approach of process flow sheet for upgrading the porcellanite, consists of a preliminary size reduction and bulk classification of the mineral raw material, followed by a first stage of concentration in heavy liquid, and a final wet disintegration of the gravitationally separated size fractions.

Thus, a sample of 50 kg is pooled from the exploratory mine, size reduced and bulk classified in the same manner and instrumentation as in the first variant of process flow sheet.

Resulting size ranges are subjected to preliminary opal concentration by heavy liquid separation in a zinc chloride solution of 1.7 specific gravity. Afterwards the light fractions, enriched in opal, are subsequently concentrated by a wet scrubbing-disintegration operation, similarly conducted as described in the first technology of benefication.

Parameters and material balance are illustrated in Tables 11 and 12.

The complete mass balance of porcellanite beneficiation is summarized in Table 13.

The examination of tables reveals preferential gravity concentration methods for each of the size classes processed. Heavy liquid separation is more efficient for smaller fractions (1.6/1.0 and 2.5/1.6 mm), whereas medium size ranges favorably behave in jigging device. Fractions 6.3/4.0; 4.0/2.5 and 2.5/1.6 mm resulting by moderate comminution, and sorting of largest size range (9.5/6.3) are also satisfactorily concentrated by jigging.

Accordingly, a combined flow sheet is envisaged for achieving an optimum weight yield, and related recovery of the valuable opaliform active silica, as it is shown in Table 13.

EXPLANATORY NOTE

Weight recovery or yield is the portion of material separated in one of the products (concentrate, middling, or tailing) of certain operations or stage of the process.

Useful mineral recovery is that portion of the valuable content of the feed which is recouped in the process as concentrate.

The mass balance results from the formula:

$$Ff = Cc + Tt$$

where F, C and T are the weights of feed, concentrate and tailing, and f, c and t the corresponding assays of a valuable mineral matter.

F/C is the ratio of concentration and c/f is the enrichment ratio

The recovery in valuable mineral (R)—usually known as the metal recovery—is given by the formula $$R = Cc/Ff \times 100$$

TABLE 1

GRAIN SIZE DISTRIBUTION (BY DRY SCREENING) OF THE COMMINUTED RAW PORCELLANITE SAMPLE

| [Millimeters] | [Inch/Mesh] | Weight (kg) | percentage | percentage |
|---|---|---|---|---|
| +9.5 | +⅜ in | 1.0 | 1.0 | 1.0 |
| 9.5/6.3 | ⅜-¼ in | 20.6 | 20.6 | 33.6 |
| 4.0/2.5 | 5-7 | 23.4 | 23.4 | 57.0 |
| 2.5/1.6 | 7-10 | 17.6 | 17.6 | 74.6 |
| 1.6/1.0 | 10-18 | 12.4 | 12.4 | 87.0 |
| -1.0 | under 18 | 13.0 | 13.0 | 100.0 |
| Total | | 100.0 | 100.0 | |

TABLE 2

CHEMICAL ANALYSIS OF THE SIZE FRACTIONS SEPARATED BY DRY SCREENING

| Fraction [mm] | Yield [%] | Contents of Main Mineral Species [%] | | |
|---|---|---|---|---|
| | | Tridymite | Calcite | Quartz |
| +9.5 | 1.0 | 53.5 | 38.2 | 5.5 |
| +6.3 | 12.0 | 50.0 | 43.4 | 3.7 |
| +4.0 | 20.6 | 44.5 | 48.5 | 4.3 |
| +2.5 | 23.4 | 42.5 | 50.7 | 3.6 |
| +1.6 | 17.6 | 40.6 | 52.9 | 2.8 |
| +1.0 | 12.4 | 38.9 | 53.9 | 2.7 |
| -1.0 | 13.0 | 44.5 | 49.1 | 3.1 |
| Balance | 100.0 | 43.3 | 49.0 | 3.5 |

TABLE 3

PERFORMANCE OF WET DISINTEGRATION PROCESS IN A TUMBLING JAR FOR DIFFERENT SIZE CLASSES

| Class Processed (mm) | Products Obtained | Yield (%) per operation | CHEMICAL CONTENTS (%) | | |
|---|---|---|---|---|---|
| | | | Tridymite | Calcite | Quartz |
| 9.5/6.3 | Feed | 100 | 50.00 | 43.4 | 3.7 |
| | Oversize | 60 | 78.1 | 14.7 | 6.5 |
| | Fines | 40 | 8.0 | 86.0 | 0.4 |
| 6.3/4.0 | Feed | 100 | 44.50 | 48.5 | 4.3 |
| | Oversize | 49 | 83.3 | 10.0 | 6.6 |
| | Fines | 51 | 7.5 | 80.1 | 2.1 |
| 4.0/2.5 | Feed | 100 | 42.30 | 50.7 | 3.0 |
| | Oversize | 45 | 85.0 | 9.7 | 5.0 |
| | Fines | 55 | 7.6 | 84.1 | 2.1 |
| 2.5/1.6 | Feed | 100 | 40.6 | 52.9 | 2.8 |
| | Oversize | 38 | 85.2 | 10.2 | 4.0 |
| | Fines | 62 | 13.3 | 79.0 | 2.1 |
| 1.6/1.0 | Feed | 100 | 38.9 | 53.9 | 2.7 |
| | Oversize | 33 | 87.2 | 8.2 | 4.4 |
| | Fines | 67 | 15.4 | 76.2 | 1.9 |

TABLE 4

GRAIN SIZE DISTRIBUTION AND CHEMICAL CONTENTS OF PORCELLANITE PRECONCENTRATES, RESULTING AFTER DIFFERENTIAL DISINTEGRATION OF SIZE CATEGORIES

| Size Range [mm] | Weight Recovery | | Final Chemical Contents After Disintegration and Size Fractions Readjustment | | |
|---|---|---|---|---|---|
| | after disintegration (%) | after resizing (%) | Opal (%) | Calcite (%) | Quartz (%) |
| 9.5/6.3 | 7.2 | 6.2 | 80.0 | 12.7 | 6.5 |
| 6.3/4.0 | 10.1 | 9.2 | 84.0 | 8.8 | 6.4 |
| 4.0/2.5 | 10.5 | 10.0 | 85.0 | 9.6 | 4.8 |
| 2.5/1.6 | 6.7 | 6.8 | 84.2 | 11.0 | 3.9 |
| 1.6/1.0 | 4.1 | 6.4 | 84.4 | 10.6 | 4.2 |
| Balance | 38.6 | 38.6 | 83.7 | 10.3 | 5.2 |

TABLE 5

PERFORMANCES OF CONCENTRATING THE OPALIFORM ACTIVE SILICA (TRIDYMITE) BY HEAVY LIQUID SEPARATION METHOD

| Size Fraction Processed (mm) | Specific Gravity of Separation | Products Separated | Yield [%] per weight | ASSAY | | |
|---|---|---|---|---|---|---|
| | | | | Opal (%) | Calcite (%) | Quartz (%) |
| 1.6/1.0 | 1.7 | Feed | 100 | 84.4 | 10.6 | 4.2 |
| | | Float | 80 | 93.7 | 5.1 | 0.2 |
| | | Sinks | 20 | 46.5 | 32.7 | 19.8 |
| | 1.6 | Float | 69 | 95.0 | 4.2 | — |
| | | Sinks | 31 | 60.9 | 24.8 | 13.5 |
| | 1.5 | Float | 25 | 96.3 | 3.0 | — |
| | | Sinks | 75 | 80.5 | 13.2 | 5.6 |
| 2.5/1.6 | 1.7 | Feed | 100 | 84.2 | 11.0 | 3.9 |
| | | Float | 84 | 93.8 | 4.7 | 0.6 |
| | | Sinks | 16 | 33.8 | 44.3 | 21.2 |
| | 1.6 | Float | 78 | 95.1 | 3.5 | 0.5 |
| | | Sinks | 22 | 45.5 | 37.7 | 15.9 |
| | 1.5 | Float | 28 | 96.8 | 2.5 | — |
| | | Sinks | 72 | 79.3 | 14.3 | 5.6 |
| 4.0/2.5 | 1.7 | Feed | 100 | 80.0 | 9.6 | 4.8 |
| | | Float | 78 | 93.9 | 4.2 | 1.0 |
| | | Sinks | 22 | 53.0 | 28.2 | 17.8 |
| | 1.6 | Float | 65 | 95.2 | 3.6 | 0.4 |
| | | Sinks | 35 | 65.8 | 20.6 | 12.7 |
| 6.3/4.0 | 1.7 | Feed | 100 | 84.0 | 8.8 | 6.4 |
| | | Float | 78 | 92.2 | 5.2 | 1.6 |

TABLE 5-continued

PERFORMANCES OF CONCENTRATING THE OPALIFORM ACTIVE SILICA (TRIDYMITE) BY HEAVY LIQUID SEPARATION METHOD

| Size Fraction Processed (mm) | Specific Gravity of Separation | Products Separated | Yield [%] per weight | ASSAY Opal (%) | Calcite (%) | Quartz (%) |
|---|---|---|---|---|---|---|
|  |  | Sinks | 22 | 54.8 | 21.2 | 23.1 |
|  | 1.6 | Float | 63 | 95.0 | 3.2 | 0.8 |
|  |  | Sinks | 37 | 65.1 | 18.0 | 15.9 |
| 9.0/6.3 | 1.7 | Feed | 100 | 80.0 | 12.7 | 6.5 |
|  |  | Float | 69 | 90.0 | 8.6 | 0.6 |
|  |  | Sinks | 31 | 57.8 | 21.7 | 19.6 |

TABLE 6

MATERIAL BALANCE OF HEAVY LIQUID SEPARATION METHOD FOR CONCENTRATING THE OPAL FROM PORCELLANITE

| Size Fraction (mm) | Specific Gravity of Separation | Weight Recovery of Concentrates per Operation | per Total | Content of Opal [%] | Recovery of Opal |
|---|---|---|---|---|---|
| 1.6/1.0 | 1.7 | 80 | 5.1 | 93.7 | 11.0 |
|  | 1.6 | 69 | 4.4 | 95.0 | 9.7 |
|  | 1.5 | 25 | 1.6 | 96.3 | 3.6 |
| 2.5/1.6 | 1.7 | 84 | 5.7 | 93.8 | 12.3 |
|  | 1.6 | 78 | 5.3 | 95.1 | 11.6 |
|  | 1.5 | 28 | 1.9 | 96.8 | 4.3 |
| 4.0/2.5 | 1.7 | 78 | 7.8 | 93.9 | 16.9 |
|  | 1.6 | 65 | 6.5 | 95.2 | 14.3 |
| 6.3/4.0 | 1.7 | 78 | 7.2 | 92.2 | 15.3 |
|  | 1.6 | 63 | 5.8 | 95.0 | 12.7 |
| 9.5/6.3 | 1.7 | 69 | 4.3 | 90.0 | 8.9 |

BALANCE OF OPAL CONCENTRATION BY HEAVY LIQUID SEPARATION IN DIFFERENT DENSITIES OF ZnCl$_2$ SOLUTION

| sp. gr. 1.7 | — | — | 30.1 | 92.9 | 64.5 |
| sp. gr. 1.6 | — | — | 22.0 | 95.1 | 48.3 |

TABLE 7

PERFORMING OF CONCENTRATING THE OPALIFORM ACTIVE SILICA (TRIDYMITE) IN A LABORATORY JIGGING DEVICE

| Size Fractions Processed (mm) | Products Separated | Yield % per weight | ASSAY Opal (%) | Calcite (%) | Quartz (%) |
|---|---|---|---|---|---|
| 1.6/1.0 | Feed | 100 | 84.4 | 10.6 | 4.2 |
|  | Concentrate | 50 | 91.0 | 7.2 | 0.9 |
|  | Middlings | 50 | 77.8 | 14.0 | 7.6 |
| 2.5/1.6 | Feed | 100 | 84.2 | 11.0 | 3.9 |
|  | Concentrate | 76 | 94.6 | 4.4 | 0.2 |
|  | Middlings | 24 | 51.6 | 32.3 | 15.2 |
| 4.0/2.5 | Feed | 100 | 85.0 | 9.6 | 4.8 |
|  | Concentrate | 75 | 95.0 | 3.9 | 0.4 |
|  | Middlings | 25 | 55.2 | 26.3 | 17.6 |
| 6.3/4.0 | Feed | 100 | 84.0 | 8.8 | 6.4 |
|  | Concentrate | 78 | 94.3 | 4.6 | 0.3 |
|  | Middlings | 22 | 47.7 | 23.6 | 28.1 |
| 9.5/6.3 | Feed | 100 | 80.0 | 12.7 | 6.5 |
|  | Concentrate | 40 | 88.1 | 9.0 | 2.0 |
|  | Middlings | 60 | 74.5 | 15.1 | 9.5 |
| 6.3/4.0 from ground 9.5/6.3 | Feed | 24 | 80.6 | 10.1 | 8.6 |
|  | Concentrate | 17 | 94.4 | 4.3 | 0.5 |
|  | Middlings | 7 | 47.1 | 24.2 | 28.0 |
| 4.0/2.5 from ground 9.5/6.3 | Feed | 29 | 81.2 | 11.8 | 6.5 |
|  | Concentrate | 21 | 94.1 | 4.5 | 0.4 |
|  | Middlings | 8 | 46.2 | 31.0 | 22.1 |
| 2.5/1.6 from ground 9.5/6.3 | Feed | 21 | 80.4 | 12.6 | 6.3 |
|  | Concentrate | 15 | 93.9 | 4.8 | 0.4 |
|  | Middlings | 6 | 46.0 | 33.3 | 20.0 |
| 1.6/1.0 from ground 9.5/6.3 | Feed | 16 | 78.3 | 14.2 | 6.5 |
|  | Concentrate | 7 | 90.0 | 8.5 | 1.0 |
|  | Middlings | 9 | 69.9 | 17.8 | 11.0 |

TABLE 8

MATERIAL BALANCE OF PROCESS FLOW SHEET OF UPGRADING PORCELLANITE BY USING A JIGGING DEVICE AS THE FINAL CONCENTRATION IMPLEMENT

| Size Fractions Processed [mm] | Weight Recovery of Concentrates [%] per operation | per total | Content of Opal [%] | Recovery of Opal (per total) [%] |
|---|---|---|---|---|
| 1.6/1.0 | 50 | 3.2 | 91.0 | 6.7 |
| 2.5/1.6 | 76 | 5.2 | 94.6 | 11.3 |
| 4.0/2.5 | 75 | 7.5 | 95.0 | 16.5 |
| 6.3/4.0 | 78 | 7.2 | 94.3 | 15.7 |
| 9.5/6.3 disregarded | (40) | (2.5) | (88.1) | (5.0) |
| 6.3/4.0 from ground 9.5/6.3 | 70 | 1.1 | 94.4 | 2.4 |
| 4.0/2.5 from ground 9.5/6.3 | 72 | 1.3 | 94.4 | 2.8 |
| 2.5/1.6 from ground 9.5/6.3 | 71 | 1.0 | 93.9 | 2.2 |
| 1.6/1 from ground 9.5/6.3 | 44 | 0.4 | 90.0 | 0.9 |
| Balance | — | 26.9 | 94.1 | 58.5 |

TABLE 9

PERFORMANCES OF CONCENTRATING THE OPALIFORM ACTIVE SILICA (TRIDYMITE) IN A LABORATORY SHAKING TABLE

| Fractions Processed (mm) | Products Separated | Yield % per weight | ASSAY Opal (%) | Calcite (%) | Quartz (%) |
|---|---|---|---|---|---|
| 1.6/1.0 | Feed | 100 | 84.4 | 10.6 | 4.2 |
|  | Concentrate | 52 | 95.0 | 4.0 | 0.6 |
|  | Middlings | 48 | 72.9 | 18.0 | 8.1 |
| 2.5/1.6 | Feed | 100 | 84.2 | 11.0 | 3.9 |
|  | Concentrate | 49 | 90.0 | 6.9 | 2.0 |
|  | Middlings | 51 | 78.6 | 14.9 | 5.7 |
| 4.0/2.5 | Feed | 100 | 85.0 | 9.6 | 4.8 |
|  | Concentrate | 30 | 87.6 | 7.6 | 3.9 |
|  | Middlings | 70 | 83.8 | 10.4 | 5.1 |
| 1.6/1.0 from ground 4.0/2.5 | Feed | 39 | 85.5 | 9.0 | 4.8 |
|  | Concentrate | 20 | 92.8 | 4.1 | 2.4 |
|  | Middlings | 19 | 77.4 | 14.2 | 7.4 |
| 1.0/0.63 from ground 4.0/2.5 | Feed | 47 | 84.8 | 9.9 | 4.6 |
|  | Concentrate | 24 | 94.0 | 3.2 | 2.0 |
|  | Middlings | 23 | 74.8 | 16.7 | 7.6 |
| 1.6/1.0 from ground 6.3/4.0 | Feed | 40 | 85.2 | 8.1 | 6.0 |
|  | Concentrate | 21 | 92.9 | 3.8 | 2.4 |
|  | Middlings | 19 | 76.8 | 12.6 | 10.0 |
| 1.0/0.63 from ground 6.3/4.0 | Feed | 48 | 83.9 | 8.9 | 6.6 |
|  | Concentrate | 25 | 94.3 | 3.1 | 2.1 |
|  | Middlings | 23 | 72.2 | 15.2 | 11.7 |
| 1.6/1.0 from ground 9.6/6.3 | Feed | 42 | 81.6 | 11.8 | 6.0 |
|  | Concentrate | 22 | 91.8 | 4.8 | 2.6 |
|  | Middlings | 20 | 70.2 | 19.5 | 9.5 |
| 1.0/0.63 from ground | Feed | 58 | 80.6 | 12.8 | 5.9 |
|  | Concentrate | 25 | 93.3 | 4.2 | 2.0 |

TABLE 9-continued

PERFORMANCES OF CONCENTRATING THE
OPALIFORM ACTIVE SILICA (TRIDYMITE)
IN A LABORATORY SHAKING TABLE

| Fractions Processed (mm) | Products Separated | Yield % per weight | ASSAY Opal (%) | Calcite (%) | Quartz (%) |
|---|---|---|---|---|---|
| 9.6/6.3 | Middlings | 23 | 66.6 | 22.4 | 10.2 |

TABLE 10

MATERIAL BALANCE OF PROCESS FLOW SHEET OF
UPGRADING PORCELLANITE BY USING A SHAKING
TABLE AS THE FINAL CONCENTRATION
IMPLEMENT

| Size Fractions Processed [mm] | Weight Recovery of Concentrates [%] per operation | per total | Content of Opal [%] | Recovery of Opal (per total) [%] |
|---|---|---|---|---|
| 1.6/1.0 | 52 | 3.3 | 95.0 | 7.3 |
| 2.5/1.6 | 49 | 3.3 | 90.0 | 6.9 |
| 4.0/2.5 disregarded | (30) | (3.0) | (87.6) | (6.0) |
| 1.6/1.0 | 51 | 2.0 | 92.8 | 4.3 |
| 1.0/0.63 from ground 4.0/2.5 | 51 | 2.4 | 94.0 | 5.2 |
| 1.6/1.0 from ground 6.3/4.0 | 53 | 1.9 | 92.9 | 4.1 |
| 1.0/0.63 from ground 6.3/4.0 | 52 | 2.3 | 94.3 | 5.0 |
| 1.6/1.0 from ground 9.5/6.3 | 52 | 1.4 | 91.8 | 2.9 |
| 1.0/0.63 from ground 9.5/6.3 | 52 | 1.6 | 93.3 | 3.3 |
| Balance | — | 18.2 | 92.9 | 39.0 |

TABLE 11

PERFORMANCE OF AN ALTERNATIVE PROCESS
FLOW SHEET OF HEAVY LIQUID SEPARATION
FOLLOWED BY WET DISINTEGRATION

| Size Fractions Processed [mm] | Products Separated | Yield % per weight | ASSAY Opal [%] | Calcite [%] | Quartz [%] |
|---|---|---|---|---|---|
| A. HEAVY LIQUID SEPARATION | | | | | |
| 9.6/6.3 | Feed | 100 | 50.0 | 43.4 | 3.7 |
|  | Float | 42 | 80.0 | 17.4 | 1.1 |
| 6.3/4.0 | Feed | 100 | 44.5 | 48.5 | 4.3 |
|  | Float | 38 | 80.1 | 17.9 | 0.5 |
| 4.0/2.5 | Feed | 100 | 42.3 | 50.7 | 3.6 |
|  | Float | 35 | 80.4 | 18.2 | 0.2 |
| 2.5/1.6 | Feed | 100 | 40.6 | 52.9 | 2.8 |
|  | Float | 32 | 81.2 | 17.0 | 0.3 |
| 1.6/1.0 | Feed | 100 | 38.9 | 53.9 | 2.7 |
|  | Float | 27 | 80.7 | 17.3 | 0.4 |
|  | Float Average | | 80.4 | 17.6 | 0.5 |
| B. WET DISINTEGRATION OF "FLOAT" FRACTIONS | | | | | |
| 9.6/6.3 | Feed | 42 | 80.0 | 17.4 | 1.1 |
|  | Concentrate | 32 | 93.9 | 4.4 | 1.0 |
| 6.3/4.0 | Feed | 38 | 80.1 | 17.9 | 0.5 |
|  | Concentrate | 24 | 95.2 | 3.7 | 0.5 |
| 4.0/2.5 | Feed | 35 | 80.4 | 18.2 | 0.2 |
|  | Concentrate | 20 | 95.3 | 3.8 | 0.4 |
| 2.5/1.6 | Feed | 32 | 81.2 | 17.0 | 0.3 |
|  | Concentrate | 16 | 94.8 | 4.0 | 0.5 |
| 1.6/1.0 | Feed | 27 | 80.7 | 17.3 | 0.4 |
|  | Concentrate | 12 | 94.9 | 3.6 | 0.5 |
|  | Concentration Average | | 94.7 | 4.0 | 0.6 |

TABLE 12

MATERIAL BALANCE OF THE PROCESS FLOW SHEET
INCLUDING HEAVY LIQUID SEPARATION (HLS)
FOLLOWED BY WET DISINTEGRATION

| Size Fractions [mm] | Yield (%) of HLS Preconcentrates per operation | per total | Content of Opal (%) | Recovery of Opal (%) |
|---|---|---|---|---|
| 9.5/6.3 | 42 | 5.0 | 80.0 | 9.2 |
| 6.3/4.0 | 38 | 7.8 | 80.1 | 14.4 |
| 4.0/2.5 | 35 | 8.2 | 80.4 | 15.2 |
| 2.5/1.6 | 32 | 5.6 | 81.2 | 10.5 |
| 1.6/1.0 | 27 | 3.3 | 80.7 | 6.2 |
| Partial Balance |  | 29.9 | 80.4 | 55.5 |

| Size Fractions [mm] | Yield (%) of HLS Final Concentrates per operation | per total | Final Content of Opal (%) | Final Recovery of Opal (%) |
|---|---|---|---|---|
| 9.5/6.3 | 76 | 3.8 | 93.9 | 8.2 |
| 6.3/4.0 | 63 | 4.8 | 95.2 | 10.5 |
| 4.0/2.5 | 57 | 4.8 | 95.3 | 10.6 |
| 2.5/1.6 | 50 | 2.7 | 94.8 | 5.9 |
| 1.6/1.0 | 44 | 1.5 | 94.9 | 3.3 |
| Final Balance |  | 17.6 | 94.7 | 38.5 |

TABLE 13

GENERAL MASS BALANCE OF PORCELLANITE
BENEFICIATION PROCESS FLOW SHEET RELATED
TO A CONVENTIONAL FEED OF 1000 kg (1 ton)

| Stages of the Process Flow Sheet | Yield of Operation (kg) | (%) | Opal Content (%) | Recovery of Useful Opal (kg) | (%) |
|---|---|---|---|---|---|
| Feed | 1000 | 100 | 43.3 | 433 | 100 |
| Crushing and Sizing | 860 | 86 | 43.3 | 373 | 86 |
| Wet Disintegration | 386 | 38.6 | 83.7 | 323 | 74.6 |
| Gravity Concentration | | | | | |
| I Heavy Liquid | | | | | |
| (a. Sp. gr. 1.7) | 301 | 30.1 | 92.9 | 279 | 64.5 |
| (b. Sp. gr. 1.6) | 220 | 22.0 | 95.1 | 209 | 48.3 |
| II Jigging | 269 | 26.9 | 94.1 | 253 | 58.5 |
| III Tabling | 182 | 18.2 | 92.9 | 169 | 39.0 |
| Alternative Process Flow Sheet | | | | | |
| Feed | 1000 | 100 | 43.3 | 433 | 100 |
| Crushing and Sizing | 860 | 86 | 43.3 | 373 | 86 |
| Heavy Liquid Separation | 299 | 29.9 | 80.4 | 240 | 55.5 |
| Wet Disintegration | 176 | 17.6 | 94.7 | 167 | 38.5 |
| Combined Process Flow Sheet | | | | | |
| Feed | 1000 | 100 | 43.3 | 433 | 100 |
| Crushing and Sizing | 860 | 86 | 43.3 | 373 | 86 |
| Wet Disintegration | 386 | 38.6 | 83.7 | 323 | 74.6 |
| Gravity Concentration | | | | | |
| Heavy Liquid for fractions 1.6/1.0 + 2.5/1.6 | 97 | 9.7 | 95.1 | 92 | 21.3 |
| Jigging for fractions 4.0/2.5 + 6.3/4.0 | 147 | 14.7 | 94.6 | 139 | 32.2 |
| Jigging for comminuted and sized 9.5/6.3 | 34 | 3.4 | 94.4 | 32 | 7.4 |
| Balance | 278 | 27.8 | 94.8 | 263 | 60.9 |

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A process for the production of a high grade opaliform porcellanite having a purity of at least 80% by weight of active silica comprising grinding and screening porcellanite rock to form granules having an average diameter of between about 0.6 and 18 mm and then subjecting said granules to wet disintegration to remove soft clays and limestone and gravitic separation to separate the at least 80% by weight of the active silica from higher density impurities intermixed therewith.

2. A process for the production of a high grade opaliform porcellanite having a purity of at least 80% by weight of active silica according to claim 1, wherein said granules are first subjected to wet disintegration to remove soft clays and limestone whereafter the remaining granules are subjected to gravitic separation to separate the opaliform active silica from higher density flint, quartz and limestone intermixed therewith.

3. A process for the production of a high grade opaliform porcellanite having a purity of at least 80% by weight of active silica according to claim 1, wherein said granules are first subjected to gravitic separation to separate the opaliform active silica from higher density flint, quartz and limestone intermixed therewith whereafter the remaining granules are subjected to wet disintegration to remove soft clays and limestone therefrom.

4. A process for the production of a high grade opaliform porcellanite having a purity of at least 80% by weight of active silica according to claim 1, wherein said wet disintegration is carried out by wet scrubbing said granules in a rotating drum scrubber with aqueous solution.

5. A process for the production of a high grade opaliform porcellanite having a purity of at least 80% by weight of active silica according to claim 1, wherein said wet disintegration is carried out by wet scrubbing said granules in a rotating drum scrubber with aqueous solution with the addition of balls.

6. A process for the production of a high grade opaliform porcellanite having a purity of at least 80% by weight of active silica according to claim 1, wherein said gravitic separation is carried out by a sink float method utilizing a heavy liquid having a density of between about 1.6 and 2.

7. A process for the production of a high grade opaliform porcellanite having a purity of at least 80% by weight of active silica according to claim 6, wherein said heavy liquid is a zinc chloride solution.

8. A process for the production of a high grade opaliform porcellanite having a purity of at least 80% by weight of active silica according to claim 1, wherein said gravitic separation is carried out in a jigging device.

9. A process for the production of a high grade opaliform porcellanite having a purity of at least 80% by weight of active silica according to claim 1, wherein said gravitic separation is carried out on a shaking table.

10. A process for the production a high grade opaliform porcellanite having a purity of at least 80% by weight of active silica according to claim 1, wherein said screened granules are sorted into groups of separate sized fractions and different sized fractions are subjected to different gravitic separation steps.

* * * * *